United States Patent [19]

Ohomi

[11] 4,345,506
[45] Aug. 24, 1982

[54] VACUUM TYPE BOOSTER

[75] Inventor: Atsushi Ohomi, Anjo, Japan

[73] Assignee: Aisin Seiki Company, Ltd., Kariya, Japan

[21] Appl. No.: 147,590

[22] Filed: May 7, 1980

[30] Foreign Application Priority Data

May 17, 1979 [JP] Japan .................................. 54-61104

[51] Int. Cl.³ .......................... F15B 9/10; F01B 19/00; F16J 3/02
[52] U.S. Cl. .................................... 91/376 R; 92/48; 92/99
[58] Field of Search .................... 92/48, 49, 99, 98 D; 91/369 A, 369 B, 369 R, 376 R

[56] References Cited

U.S. PATENT DOCUMENTS

| 3,096,689 | 7/1963 | Kytta | 92/48 |
| 3,152,518 | 10/1964 | Ayers, Jr. | 92/49 |
| 3,411,414 | 11/1968 | Brown et al. | 92/48 |
| 3,517,588 | 6/1970 | Kytta | 92/48 |
| 4,173,172 | 11/1979 | Ohmi | 92/48 |

Primary Examiner—Paul E. Maslousky
Attorney, Agent, or Firm—Oblon, Fisher, Spivak, McClelland & Maier

[57] ABSTRACT

A vacuum type brake booster provided with a first power piston which includes a hub portion made of plastic material and a disc portion made of metal with a plate being interposed between the hub portion and the disc portion which is provided with a plurality of notches for clamping a flange portion of the hub portion. A second power piston is also utilized which includes a sleeve with an inner diameter sufficient to incorporate therein the hub portion. The rear end of the sleeve is radially inwardly bent so as to be clamped between the flange and the plate. Thus the first and second pistons are firmly innerconnected.

3 Claims, 4 Drawing Figures

VACUUM TYPE BOOSTER

BACKGROUND OF THE INVENTION

1. Field of the Invention

This invention relates to a vacuum type brake booster for reducing the brake pedal depressing force of automobiles.

2. Description of the Prior Art

Brake boosters generally installed within an engine compartment of vehicle and engine intake manifold are used as a negative pressure source for the booster. Since the volume of the vacuum obtained from the intake manifold is limited to a certain amount, the size of the brake booster itself is required to be larger if a larger amount of output thereof is needed. However, in the space provided the engine there are many other devices which interfere with the installation of a larger sized brake booster. Thus, the tandem type brake booster assembly (two power pistons) has been adapted to reduce the diameter of the brake booster.

This tandem type, however, has a drawback in that the entire axial length thereof must be elongated so as to arrange two pistons in tandem.

SUMMARY OF THE INVENTION

Accordingly, one object of the present invention is to connect tandem power pistons with each other so as to reduce the entire axial length of the booster.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Figure 1:
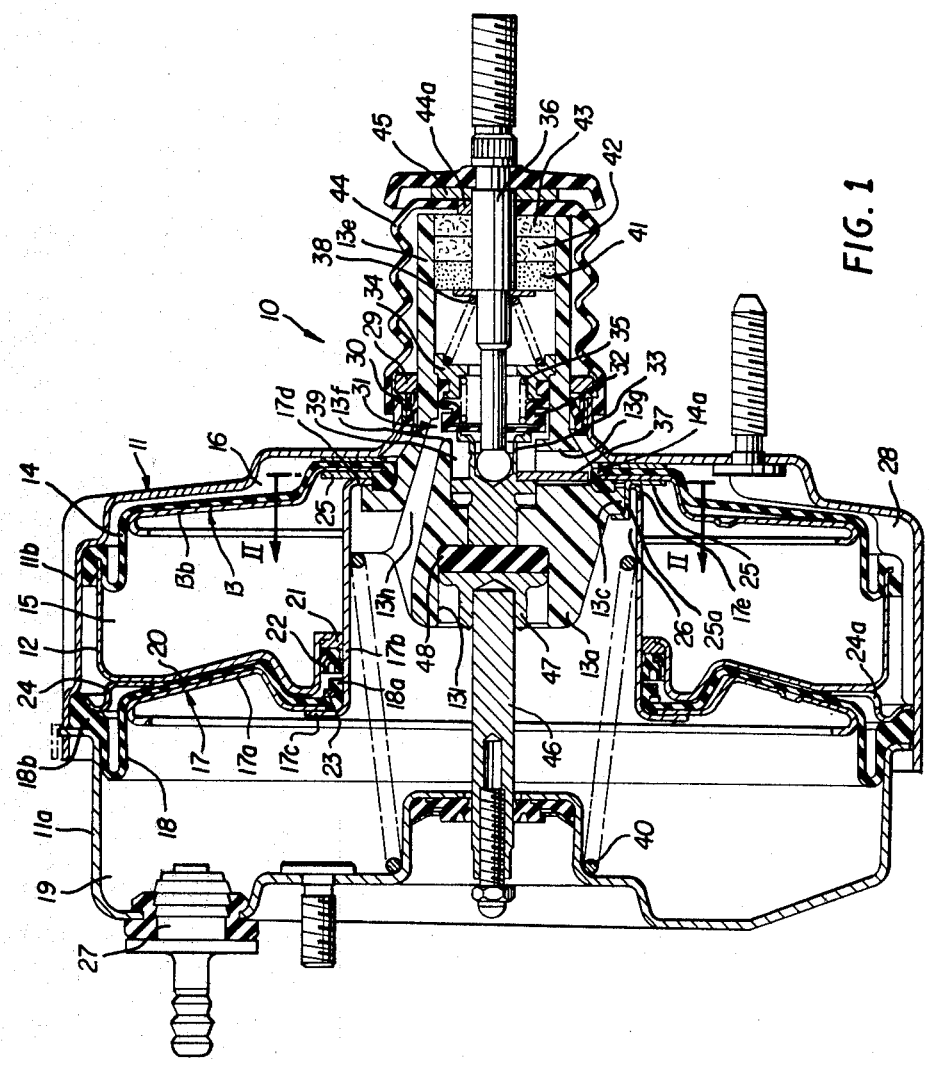
FIG. 1 is a cross-sectional view of the present invention.
Figure 4:
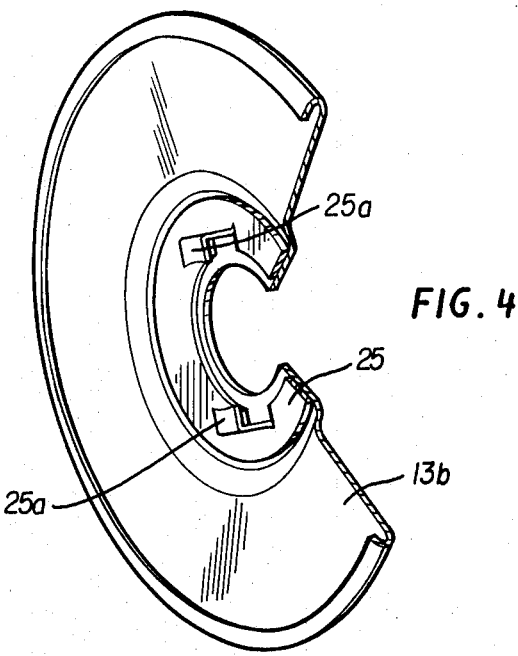
FIG. 4 is a perspective view of a disc portion of the first power piston.

Referring now to FIGS. 1–4, a vacuum type brake booster 10 includes a housing 11 which is divided into front and rear portions 11a and 11b integrally connected with each other. The interior of the housing 10 is divided into two compartments by a partition wall 12. The rear compartment is further divided into a first constant pressure chamber 15 and a first variable pressure chamber 16 by a first power piston 13 and a first diaphragm 14. The front compartment is also divided into a second constant pressure chamber 19 and a second variable pressure chamber 20 by a second power piston 17 and second diaphragm 18.

The second power piston 17 includes a metallic disc portion 17a and metallic sleeve portion 17b. The sleeve portion 17b includes at the front portion thereof an outwardly bent flange 17c which is secured to the inner peripheral portion of the disc portion 17a by, for example, welding. The sleeve portion 17b is supported by a ring bearing 21 arranged at the center opening of the partition wall 12.

Seal member 22 is attached at the front side of the ring bearing 21 for an air-tight fit between the sleeve portion 17b and the partition wall. An inner peripheral portion 18a of the second diaphragm 18 is air-tightly secured to the front outer periphery of the sleeve portion 17b by a tightening ring 23. The outer peripheral portion 18b of the second diaphragm 18 is also air-tightly secured between a member 24 secured to the partition wall and the front portion 11a of the housing 11.

The first power piston 13 includes a plastic or resin core portion 13a and a metallic disc portion 13b. The front face of the inner peripheral portion of the disc portion 13b is provided with two pawls 25a formed in a plate 25 welded to the disc portion 13b. The pawls 25a extend forwardly and are bent inwardly at their axial end portions. Each top end of the pawls 25a engages with a front face of flange 13c provided at the outer periphery of the core portion 13a so that the disc portion 13b is prevented from rearward movement with respect to the core portion 13a.

Thus secured, inner peripheral portion 14a of the first diaphragm 14 pushes the disc portion 13b due to its elasticity rearwardly with respect to the core portion 13a thereby forcing the ends of the pawls 25a to the front face of the flange 13c and connecting the core portion 13a and disc portion 13b with each other. The outer peripheral portion 14b of the first diaphragm 14 is air-tightly secured between the rear end of the partition wall 12 and the rear portion 11b of the housing 11.

The sleeve portion 17b of the second power piston 17 has a sufficient inner diameter so as to accomodate the core portion 13a of the first power piston 13. The rear end 17d of the sleeve portion 17b is bent inwardly and is secured between the flange 13c of the first piston 13 and the plate 25. Thus the two pistons 13 and 17 are integrally connected with each other.

Figure 2:
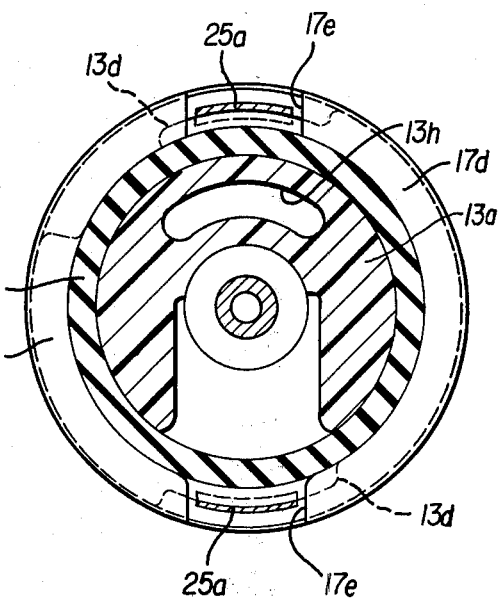
FIG. 2 is a cross-sectional view taken along line II—II of FIG. 1.
Figure 3:
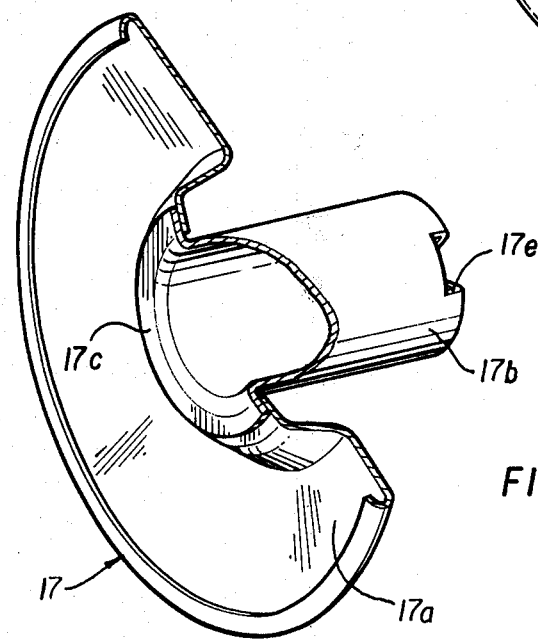
FIG. 3 is a perspective view of the second power piston.

The axial ends of the pawls 25a are bent prior to the assembling procedure of the booster 10, and in order to facilitate the assembling procedure, two recesses 13d are provided on the flange 13c of the core portion 13a for allowing pawls 25a to pass therethrough (see FIG. 2). Similarly, two recesses 17e are provided on the rear end 17d of the sleeve portion 17b of the second power piston 17 for accepting the notches 25a therein.

In order to meet the centers of both pistons 13 and 17 and in order to use recessed 17e as a communication passage between the constant pressure chambers 15 and 19, the flange 13c of the core portion 13a of the first power piston 13 is provided with a raised or higher portion which is in contact with the inner periphery of the sleeve portion 17b and a lower portion which engages with pawls 25a. Further, a space or clearance 26 is provided between the pawls 25a and the inner peripheral surface of the sleeve portion 17b for communication between the two constant pressure chambers 15 and 19.

A one way valve 27 is provided on the rear wall of the housing 11 so that both chambers 15 and 19 maintain the same negative pressure level therein transmitted from a negative pressure source (not shown) through valve 27. On the other hand, two variable pressure chambers 16 and 20 are in communication with each other through recesses 24a provided on the peripheral wall portion of the rear portion 11b of the housing 11.

The core portion 13a of the first power piston 13 includes a hollow axial portion 13e extending out of the rear wall of the housing 11. The axial portion 13e is slidably supported by a ring bearing 29 attached to the housing 11 and a seal member 30 is provided at the front side portion of the ring bearing 29.

A control valve mechanism 31 which includes a control valve 32 and an air valve 33 are provided in the axial portion 13e as is well known and as shown, for example, in U.S. application Ser. No. 960,626, now pending. The control valve 32 is at its rear end air tightly fixed to the inner wall of the axial portion 13e by retainer 34 and includes an axially movable front portion which is biased toward a valve seat portion 13f provided on the core portion 13a by the force of spring 35.

Air valve 33 is connected to a push rod 36 which is operatively connected to brake pedal (not shown). In response to movement of push rod 36, the air valve 33 is in contact with or separate from the front end of the control valve 32. The air valve 33 engages the inner end portion of a key 37 radially inserted into the core portion 13a for preventing the air valve 33 from rearward movement with respect to the core portion 13a. The push rod 36 is continuously biased towards the right as viewed in FIG. 1 by spring 38.

When the brake pedal is released, push rod 36 as well as control valve 32 and air valve 33 is positioned under the conditions of FIG. 1. The first variable pressure chamber 16 is in communication with the second variable pressure chamber 19 through passage 13g provided in the core portion 13a, passage 39 provided on the outer periphery of air valve 33, the space between the control valve 32 and seat 13f and passage 13h provided in the core portion 13a.

Under this condition, since the amount of pressure in the two variable pressure chambers are the same as the two constant pressure chambers, both power pistons 13 and 17 are kept in the position shown in FIG. 1 by the force of spring 40.

When the brake pedal is depressed, push rod 36, air valve 33 and control valve 32 are moved leftward. First, the control valve 32 comes in contact with the seat 13f so as to interrupt communication between the variable pressure chamber 16 and constant pressure chamber 19 as valve 33 is then separated from control valve 32 to establish communication between the variable pressure chamber 16 and atmospheric pressure through passages 13g and 39, the space between the valves 32 and 33, control valve 32, the spaces of retainer 34 and axial portion 13e, filters 41, 42 and 43, hole 44a of boot 44 and a further air filter 45. The atmospheric pressure introduced into the variable pressure chamber 16 through the passages above is also transmitted to the other variable pressure chamber 20 through recesses 24a. Due to the pressure differential between chambers 16 and 20 and chambers 15 and 19, both power pistons 13 and 17 are integrally moved leftward as viewed in FIG. 1.

An output rod 46, the left end of which is operatively connected to a brake master cylinder piston (not shown), is at its right end portion secured to a disc plate 47 which is slidably received in a hole 13; provided in the core portion 13a. Another disc plate 48 made of rubber or the like is also provided in hole 13i and the power generated by movement of the two pistons 13 and 19 is transmitted to the disc plate 47 through the elastic disc plate 48. Upon such power transmission, disc plate 48 is elastically deformed so as to be in contact with the front face of air valve 33. Thus the reaction force proportional to the power of the two pistons 13 and 17 is transmitted to the pedal through the push rod. According to the present invention, only the disc portion 13b of the power piston 13 oppositely faces the partition wall 12 and, therefore, it is sufficient to provide a clearance between the disc portion 13b and the partition wall 12 so as not to interfere the stroke of the first power piston 13 which results in reduction of the entire axial length of the booster 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vacuum type brake booster comprising:
   a negative pressure source;
   a housing;
   a partition wall positioned within said housing;
   front and rear chambers defined within said housing by said partition wall;
   a first power piston and first diaphragm means positioned in said rear chamber, said rear chamber further comprising a first constant pressure chamber and a first variable pressure chamber defined by said first power piston and said first diaphragm means;
   a second power piston and second diaphragm means positioned in said front chamber, said front chamber further comprising a second constant pressure chamber and a second variable pressure chamber defined by said second power piston and said second diaphragm means, said first and second power pistons being integrally connected with each other, said first and second constant pressure chambers communicating with each other and communicating with said negative pressure source and said first and second variable pressure chambers communicating with each other;
   said first power piston including a hollow axial portion slidably and sealingly extending through a rear wall portion of said housing;
   a valve mechanism disposed in said hollow axis portion of said first power piston for selectively connecting said first and second variable pressure chambers with said constant pressure chambers and atmospheric pressure; said first power piston including a plastic core portion including said hollow axial portion and a metallic disc portion, said metallic disc portion including a plurality of pawls formed therein extending forwardly from the inner peripheral portion of said disc portion and being bent inwardly at end portions thereof; said core portion including a flange portion at the outer periphery thereof; said flange portion of said core portion and an inner peripheral portion of said first diaphragm means being enclosed between said inner peripheral portion of said disc portion and said end portion of said pawls to thereby secure said core portion and said disc portion; said second power piston including a sleeve portion sealingly and slidably extending through said partition wall of said housing, said sleeve portion having a sufficient inner diameter for receiving said core portion of said first power piston; and said sleeve portion including an inwardly bent portion at the rear end portion thereof between said flange portion and said inner peripheral portion of said disc portion interconnecting said first and second power pistons.

2. The vacuum type brake booster as set forth in claim 1, said valve mechanism comprising control valve means and air valve means and said vacuum type booster further comprising a push rod member operatively connected to said air valve means.

3. A vacuum type brake booster as set forth in claims 1 or 2, further comprising an output rod operatively connected to said core portion.

* * * * *